United States Patent
Bentrim

(10) Patent No.: US 8,113,962 B2
(45) Date of Patent: Feb. 14, 2012

(54) SNAP-IN PIVOT PIN FOR UNIVERSAL JOINTS

(75) Inventor: Brian Bentrim, Furlong, PA (US)

(73) Assignee: PEM Management, Inc., Wilmington, DE (US)

(*) Notice: Subject to any disclaimer, the term of this patent is extended or adjusted under 35 U.S.C. 154(b) by 33 days.

(21) Appl. No.: 12/723,222

(22) Filed: Mar. 12, 2010

(65) Prior Publication Data

US 2010/0202826 A1 Aug. 12, 2010

Related U.S. Application Data

(63) Continuation-in-part of application No. 12/697,668, filed on Feb. 1, 2010, now abandoned.

(60) Provisional application No. 61/150,992, filed on Feb. 9, 2009.

(51) Int. Cl.
*F16D 3/27* (2006.01)

(52) U.S. Cl. .................. 464/125; 464/112; 464/136

(58) Field of Classification Search .................. 464/112, 464/125, 126, 128, 136, 119, 113, 114; 403/57, 403/119, 161, 163; 411/481, 495
See application file for complete search history.

(56) References Cited

U.S. PATENT DOCUMENTS

| 109,846 | A | * | 12/1870 | Smeed | 464/125 |
| 1,346,253 | A | * | 7/1920 | Rayfield | |
| 1,845,794 | A | * | 2/1932 | Jeffrey | 464/136 X |
| 1,945,209 | A | * | 1/1934 | Villard | 464/119 |
| 4,135,372 | A | * | 1/1979 | Benson | 464/112 X |
| 5,236,445 | A | * | 8/1993 | Hayhurst et al. | |
| 5,277,659 | A | * | 1/1994 | Cornay | 464/126 X |
| 5,728,004 | A | * | 3/1998 | Dziegielewski | 464/125 X |
| 6,375,577 | B1 | * | 4/2002 | Smith et al. | 464/136 |
| 7,001,411 | B1 | * | 2/2006 | Dean | |
| 2010/0202825 | A1 | * | 8/2010 | Bentrim | 403/163 |

FOREIGN PATENT DOCUMENTS

GB 279830 * 6/1928

* cited by examiner

*Primary Examiner* — Gregory Binda
(74) *Attorney, Agent, or Firm* — Gore & Associates

(57) ABSTRACT

A universal joint employs snap-in press pins to rotatably secure the center knuckle with the surrounding drive shaft cup providing a simplified assembly process. The press pins install flush or sub-flush with the outside of the steering shaft cup. A snap-lock feature permits one-direction axial movement only. Each snap pin includes a barb-like tapered flange with a lead-in ramp to aid installation. Once installed, a radially extending base on the backside of the flange abuts the inside wall of the drive shaft cup. A locking clip may be employed to prevent removal of the snap pin. The locking clip includes two axially extending legs with barbs located at the end of each leg, said legs being resiliently biased outwardly and abutting an inside wall of said drive shaft cup when fully engaged with the pin.

8 Claims, 4 Drawing Sheets

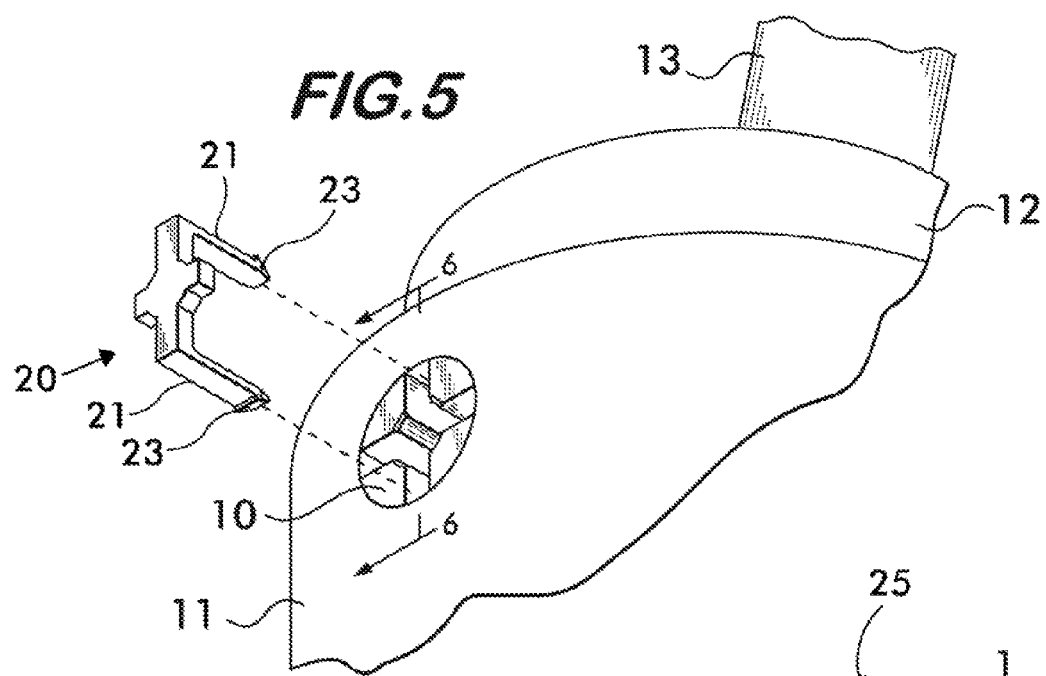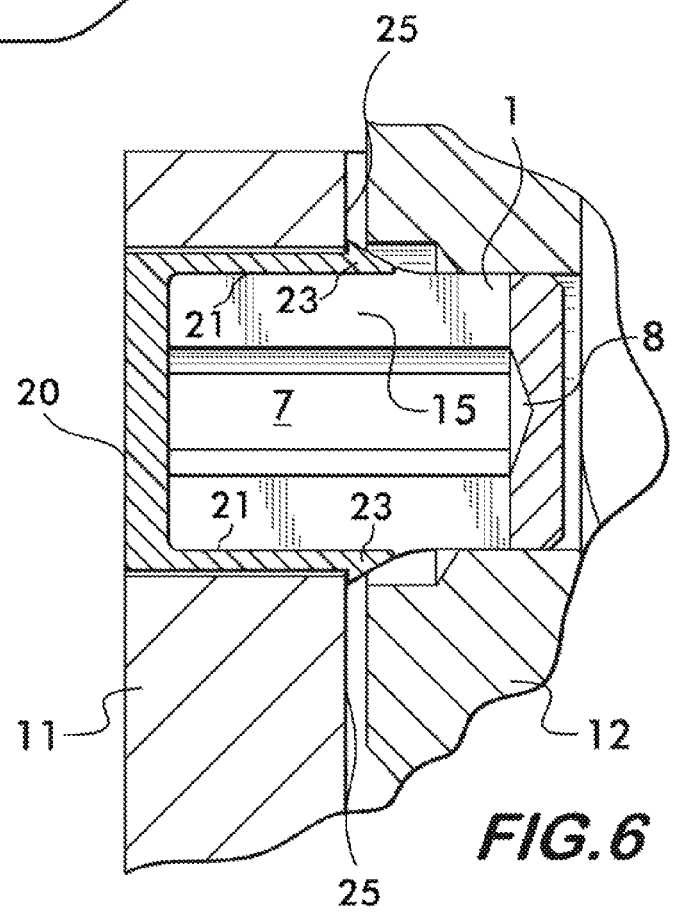

SNAP-IN PIVOT PIN FOR UNIVERSAL JOINTS

RELATED APPLICATION

This patent application is a continuation-in-part of patent application Ser. No. 12/697,668 filed Feb. 1, 2010 now abandoned for "Snap-In Pivot Pin for Universal Joints" which is related to provisional patent application Ser. No. 61/150,992 entitled "Snap-In Pivot Pin for Universal Joints" filed on Feb. 9, 2009, priority from which is hereby claimed.

FIELD OF THE INVENTION

The present invention relates to the construction and assembly of universal joints which inter-connect rotating shafts.

BACKGROUND OF THE INVENTION

Currently, a vehicle steering drive universal joint in a vehicle employs two set screws that are affixed to an outer steering shaft cup. The set screws each include a protruding pivot pin end that extends into the central pivoting ball. Unfortunately, there are several problems with this current design. The high vibration environment and constant twisting motion of the joint sometimes cause the set screws to loosen and subsequently fall free. Once the pin is loose, the steering drive may disconnect, leaving a driver without the means to steer the vehicle. Additionally, the assembly process to install the set screws is time-consuming and expensive because both screw holes in the cup need to be tapped prior to assembly. The assembly cycle time is about 12 seconds which includes placing the pin, threading the pin into the collar, hitting the pin with a wedge to mechanically lock the threads in place, rotating the assembly and repeating the process for the second side.

SUMMARY OF THE INVENTION

The present invention reduces or eliminates the above-described failure risk and as a secondary benefit, the assembly process is both streamlined and simplified. The present design replaces the set screws with a snap-in press pin that installs flush or sub-flush with the outside of the steering shaft cup. A snap lock feature permits one-direction movement only. Like the prior art screws, the press-in pin includes a pivot pin end that is fully rounded and protrudes into the center knuckle of the universal joint. Once installed, outwardly biased barbed snap arms secure the pin inside a hole of the outer cup of the joint. The pin snaps in but will not easily be pulled out. This construction is opposed by a similar pin/arm combination on the opposite side of the steering shaft. The fastener may be composed of hardened metal for durability.

As further explained below, each snap pin includes a barb-like tapered flange with a lead-in ramp to aid installation. Once installed, a radially-extending base on the back side of the flange abuts the inside wall of the steering shaft cup. The flange base prevents removal of the pin because the pin can not be withdrawn unless it is first sheared off. In operation, a torque loading on the shaft and universal joint applies only a lateral shear force on the pin. The shear loading may push one snap arm inwardly during extreme loading, but the pin will stay in place due to the effect of the other three arms. Since no axial loading occurs, there is no direct loading that can force the pin to back out of the hole. Also, because the pin is flush or sub-flush with the outer wall of the shaft, it normally encounters no external force that can compress the arms of the snap pin and cause it to disengage. However, for added security to prevent disengagement by other forces such as those induced by vibration, a safety locking clip may be employed, one for each pin. The locking clips include axially extending legs that fit into the gaps between the snap arms to prevent them from collapsing inward once installed. With the safety clips in place, the pins cannot work their way loose. Like the pins, the clip legs are resiliently biased outwardly and include barbs which provide a snap engagement with the inside wall of the steering shaft cup.

Because the pins are pressed into an unthreaded hole, the assembly process is much simpler than using set screws. The parts are assembled with an application of axial force pushing the pin's pivot end into the center knuckle until the snap flange travels completely through the wall of the shaft of the joint. This application of force can be a quick impact load and because of the co-linear orientation of the parts across the diameter of the shaft, the pins on both sides can be assembled simultaneously with the same insertion force. This can be accomplished extremely quickly and with inexpensive tooling without the need to tap the hole. The fastener installs with an audible click as the flange segments pass through the wall of the shaft and release outwardly from their bent-inward position. At this position the fastener should be flush to the outer shaft wall. The combination of the flush alignment and the audible feedback makes the installation process straightforward and makes completion of installation simple to identify.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 5 is a bottom right isometric view of the assembly of the locking clip into the snap pin.

FIG. 6 is a right side elevation sectional view taken from FIG. 5 as shown in that Figure.

DESCRIPTION OF THE PREFERRED EMBODIMENT

Figure 1:
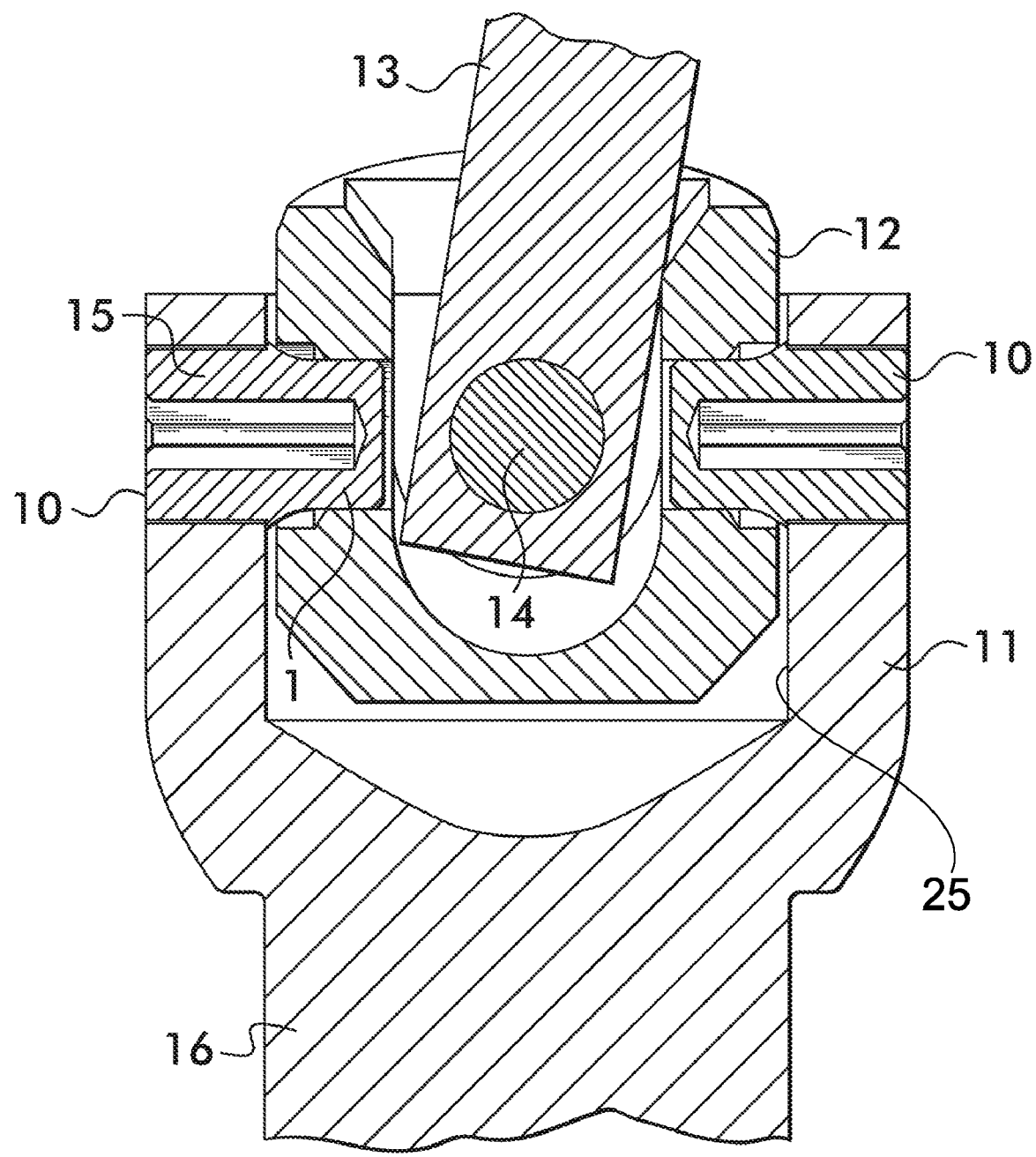
FIG. 1 is a left side sectional view of the universal joint assembly of the invention.

Referring now to FIG. 1, the universal joint assembly of the invention is shown in cross-section. A steering shaft 16 includes an outer cup structure 11 at its end includes opposing side with opposite facing coaxial holes which pivotally holds a central knuckle element 12 that in turn pivotally captures output shaft 13 about pin 14. The double pivot axes located at the joints of pins 10 and 14 lie in the same plane but are located at right angles to each other. This configuration is typical of a standard universal joint in which rotational torque may be transmitted from one shaft to another while permitting a degree of angular misalignment between the shafts. As explained above, the key aspect of the invention resides in the use of the novel press pins 10 which replace the prior art set screws at the same location by snap-fit retention. The press-pin fastener 10 of the invention has two primary body segments separated by a protruding flange. The bottom body portion 1 is mostly solid and resides inside the central knuckle 12 while the top body portion 15 is fully segmented by axial slots and resides within one wall of the shaft 11.

Figure 2:
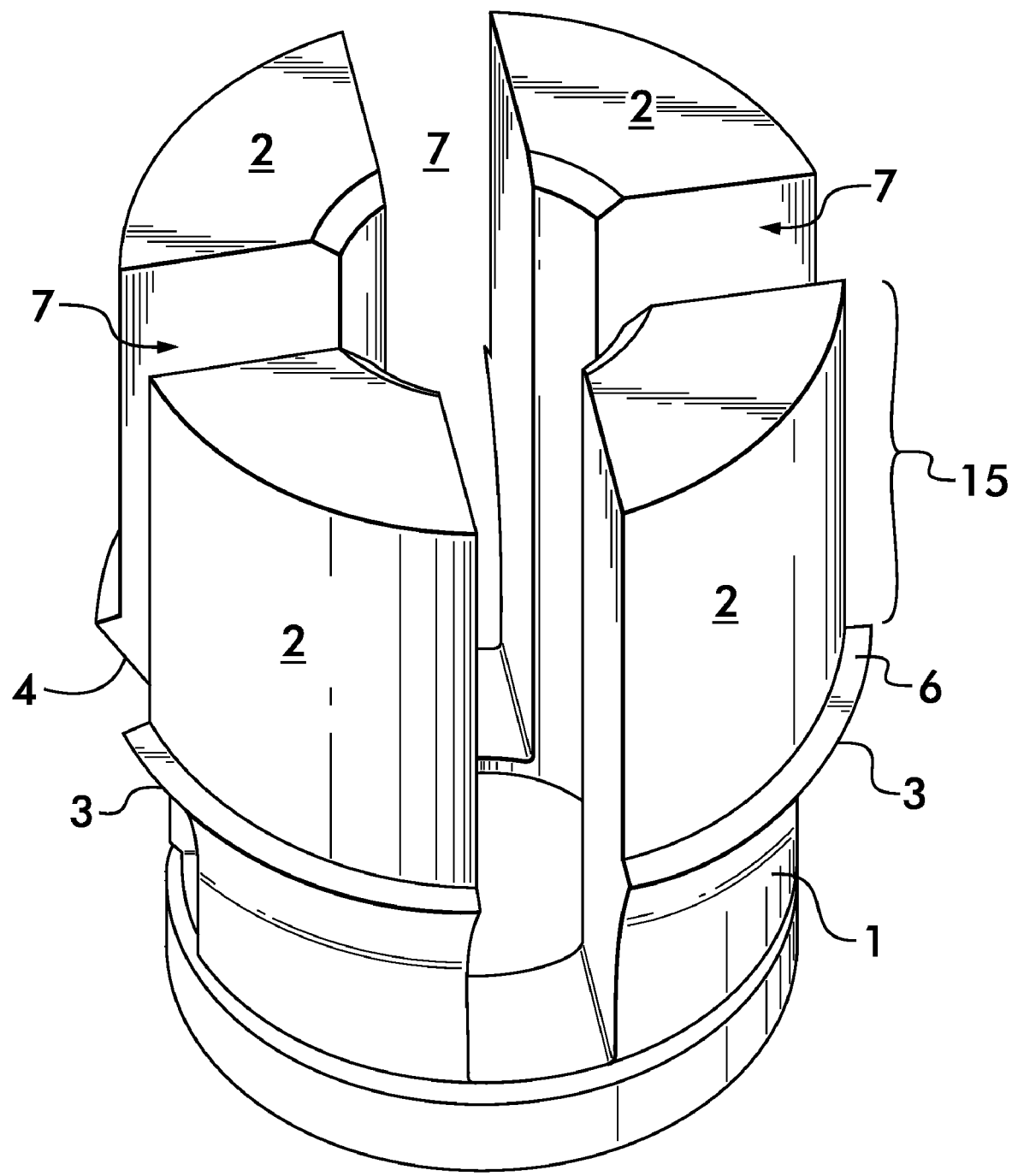
FIG. 2 is a top front isometric view of the snap-in pin of the invention.
Figure 3:
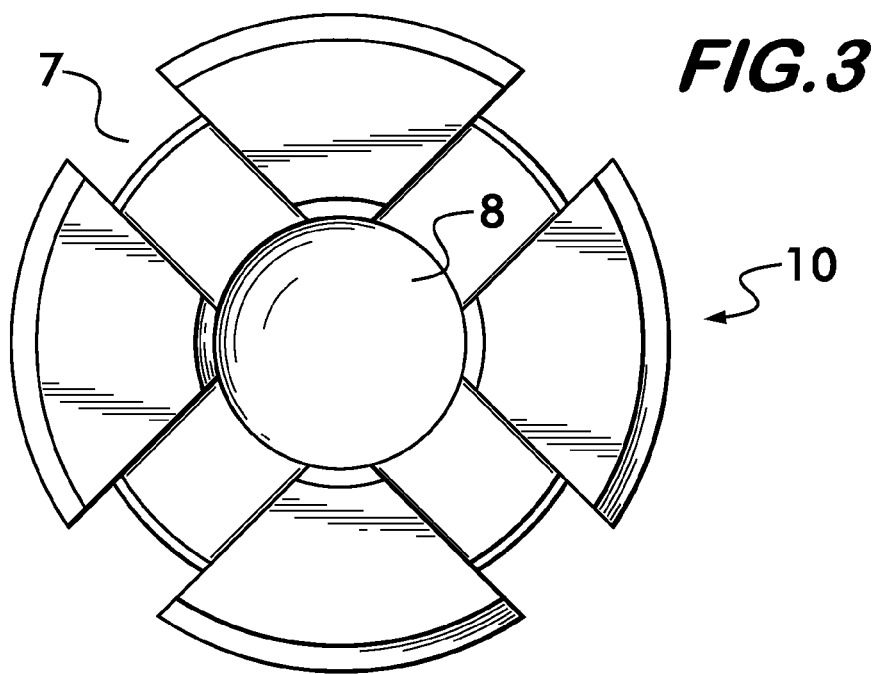
FIG. 3 is a top plan view thereof.
Figure 4:
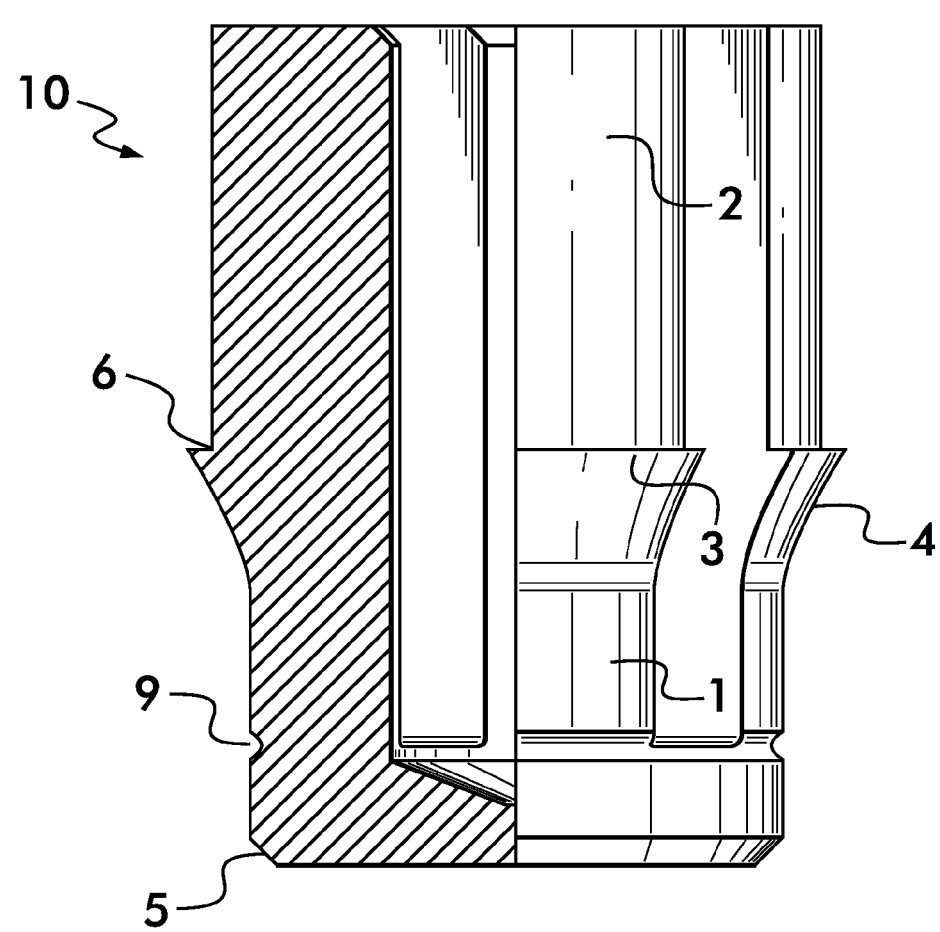
FIG. 4 is a side elevation partial sectional view thereof.

Referring now to FIGS. 2, 3 and 4 as mentioned above, a top portion 15 of the fastener 10 is comprised of a plurality of slots 7 that allow for the compression of the flange 3 on each of four legs 2. An axial bore 8 forms the bending legs of the fastener which can resiliently flex inwardly. The segmented flange 3 between the two body portions has circumferential portions located along outer surfaces of each of said legs and extending radially there from. Each segment portion includes a ramp 4 on the side of the bottom body portion 1 to help compress the segments of the flange during installation. A lead-in taper 5 aids in getting the part started in the hole. After the flange 3 is compressed to a diameter less than the diameter of the hole in the steering shaft and passes completely through the wall of the shaft, it expands again. A radially extending base 6 of the flange then rests against the inside wall 25 of the shaft cup as seen in FIG. 1 to prevent the flange segments from backing out of the shaft hole. Optionally, a relief groove 9 can be added to the bottom portion to reduce the force required to bend the flange inward. The entire part should be hardened for minimal wear of the fastener-shaft interface.

Referring now to FIGS. 5 and 6, an alternate embodiment of the invention utilizes a locking clip 20 having legs 21 which fit into the slots between the snap arms of pin 10. Barbs 23 at the end of each leg engage the back side inside wall 25 of cup 11 as more clearly shown in FIG. 6. The legs of the clip fill the slots between the snap arms and prevent them from collapsing inwardly and the pin becoming disengaged.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A rotatable pivot joint, comprising:
   a rotatable driving shaft pivotably connected to a rotatable driven shaft by a pivot joint there between whereby rotation is transmitted from the driving shaft to the driven shaft;
   a cup located at a distill end of the driving shaft;
   said cup having opposing sides with opposite facing coaxial holes;
   a center knuckle lying between said sides and being pivotably connected between said cup sides by a first pair of pins extending inwardly by snap-fit retention of deflectable integral elements of said pins through said holes in said sides;
   said driven shaft being pivotably connected to said center knuckle by a second pin extending radially inward from said knuckle, said second pin being offset radially 90° from said first pair of pins; and
   wherein said first pins each includes a solid body portion at a bottom insertion end with said deflectable integral elements being arms extending axially therefrom toward an opposite top end.

2. The device of claim 1 further wherein each of said first pair of pins includes a central axial bore located between said arms.

3. The device of claim 2 wherein each of said first pins includes axially extending slots located circumferentially between adjacent arms of each of said pins.

4. The device of claim 3 wherein each of said first pins includes a segmented flange having circumferential portions located along outer surfaces of each of said arms and extending radially therefrom.

5. The device of claim 4 wherein each flange includes a ramp convergent toward the bottom insertion end of the pin.

6. The device of claim 5 wherein each flange includes a radially extending base which sits against an inside wall of the shaft cup in which it is retained.

7. The device of claim 1 further including a locking clip with two axially extending legs said clip when axially inserted into an end of one of said first pair of pins is matingly engaged therewith whereby said legs fill at least one slot between snap arms of said one of the first pair of pins preventing said snap arms from deflecting inwardly.

8. The device of claim 7 wherein said locking clip further includes barbs located at the end of each leg said barbs being resiliently biased outwardly and abutting an inside wall of said cup when fully engaged with said pin.

\* \* \* \* \*